2,916,495
BETA-THIANAPHTHENYLALKYL HYDRAZINES AND INTERMEDIATES

William H. Edgerton, Strafford-Wayne, Pa., assignor to Smith Kline & French Laboratories, Philadelphia, Pa., a corporation of Pennsylvania No Drawing. Application December 3, 1958
Serial No. 777,821

8 Claims. (Cl. 260—307)

This invention relates to new heterocyclic derivatives in the thianaphthene series which have useful pharmacodynamic activity. More specifically, these novel compounds are β-thianaphthenylalkyl hydrazines.

The compounds of this invention have advantageous hypotensive activity. The compounds also have appreciable central nervous system activity and are useful as ataractics, psychic energizers and analgesics. They furthermore have utility as intermediates in preparing polycyclic compounds which also have pharmacodynamic activity.

The novel β-thianaphthenylalkyl hydrazines of this invention are represented by the following fundamental structural formula:

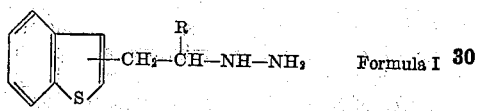

Formula I when:
R represents a lower alkyl group having 1 to 4, preferably 1 to 2, carbon atoms, or a hydrogen atom.

A particularly advantageous and useful compound is 1-[1'-methyl-2'-(3"-thianaphthenyl)-ethyl]-hydrazine.

This invention also includes pharmaceutically acceptable salts of the above defined bases formed with non-toxic organic and inorganic bases. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bis-methylenesalicylic, methanesulfonic, ethanesulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzenesulfonic and theophylline acetic acids as well as with the 8-halotheophyllines, for example 8-chlorotheophylline and 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well-known to the art.

The compounds of this invention are prepared from the corresponding β-aminoethylthianaphthene derivatives according to the following procedure:

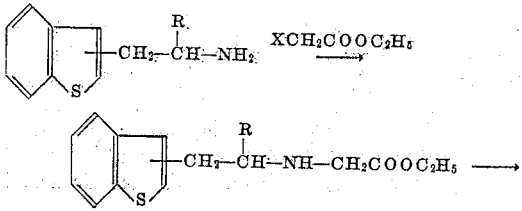

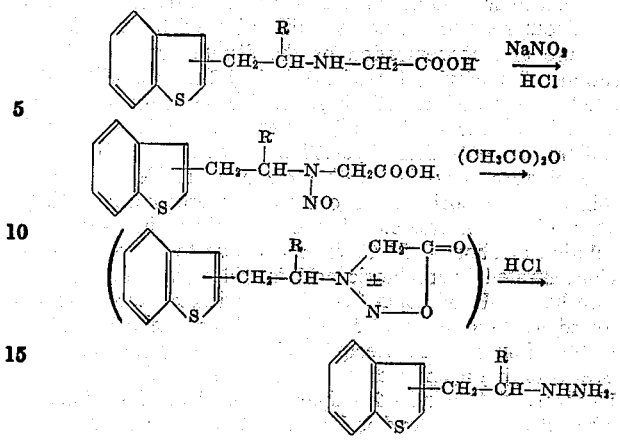

X is chlorine or bromine and R is as previously defined.
The β-aminoethylthianaphthene starting materials are prepared according to the following synthetic procedure:

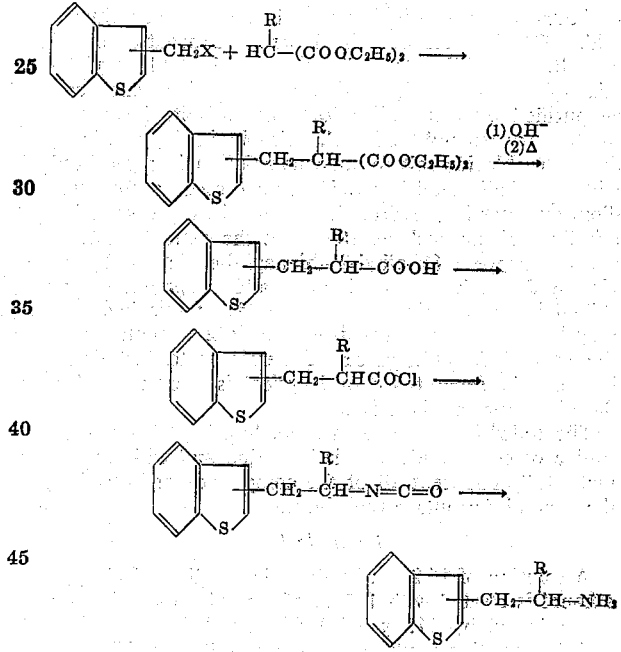

X is halogen and R is as previously defined.

The β-aminoethylthianaphthene starting materials are prepared by condensation of a halomethylthianaphthene with an equivalent amount of a diethyl α-alkyl malonate in the presence of an alkali metal alkoxide, for example, sodium or potassium methoxide or ethoxide to give diethyl α-alkyl-α-thianaphthenyl malonate which is hydrolyzed with an alkali metal hydroxide, such as sodium or potassium hydroxide, decarboxylated by heating at 170–200° C. for two to three hours and chlorinated with a chlorinating agent such as phosphorous trichloride or thionyl chloride to give the corresponding propionyl chloride. This propionyl chloride in an organic solvent such as xylene or toluene is heated at reflux with an excess of sodium azide to give upon concentration of the mixture the corresponding isocyanate which upon heating for 10–20 hours with hydrochloric acid and cooling yields β-aminoalkylthianaphthene hydrochloride. The free base is obtained by neutralizing an aqueous solution of the hydrochloride with an alkali metal hydroxide, such as sodium or potassium hydroxide, extracting with ether and evaporating the extracts leaving the free base as the residue.

The β-thianaphthenylalkyl hydrazines of this invention are prepared by condensing the ethyl ester of an α-chloro- or α-bromoacetic acid with two molar equivalents of a β-aminoethylthianaphthene. The reactants are heated at reflux in an organic solvent such as benzene or toluene for about four to six hours. Filtration of the reaction mixture and concentration of the filtrate gives, as the residue, the ethyl ester of N-(1-alkyl-2-thianaphthenylethyl)-glycine. The ester is saponified by heating at reflux with an excess of an alkali metal hydroxide, such as sodium or potassium hydroxide in aqueous solution. The mixture is washed with ether and acidified with a mineral acid such as concentrated hydrochloric acid. This mixture is treated with sodium nitrite in aqueous solution at about 0–5° C. for about two to three hours. Concentrated hydrochloric acid is added until the mixture has a pH of about 2. The reaction mixture is allowed to stand at about 5–10° C. for approximately 30 to 90 minutes. The precipitate is filtered off and dried over a drying agent such as potassium hydroxide to give N-nitroso-N-(1-alkyl - 2 - thianaphthenyl ethyl)-glycine. The nitroso compound is heated with a large excess of acetic anhydride on a steam bath for about four to six hours. The mixture is filtered and concentrated to give the crude N-(1-alkyl-2-thianaphthenylethyl)-sydnone as the residue. The sydnone is heated for about four to six hours on a steam bath with 1:1 aqueous hydrochloric acid. The hot solution is filtered. Concentration of the filtrate, cooling and filtration yields 1-(1'-alkyl-2'-thianaphthenylethyl)-hydrazine hydrochloride which can be purified by recrystallization from a suitable solvent such as, for example, ethanol. To obtain the free base, the hydrochloride salt in aqueous solution is neutralized with an alkali metal hydroxide or carbonate such as sodium or potassium hydroxide, extracted with a water-immiscible solvent such as ether and the extracts concentrated to give 1-(1'-alkyl-2'-thianaphthenylethyl)-hydrazine as the residue. It will be readily apparent to one skilled in the art that the compounds of this invention may be present as optical isomers. The connotation of the general formula presented herein is to include all isomers, the separated d or l optical isomers as well as the dl mixture of these isomers.

The following examples are not limiting but are illustrative of compounds of this invention and will serve to make fully apparent all of the compounds embraced by the general formula given above.

*Example 1*

A solution of 14.2 g. of sodium in one liter of absolute ethanol is treated with 112 g. of diethyl α-methylmalonate followed by 115 g. of 3-chloromethylthianaphthene and the resulting mixture is heated at reflux for 20 hours. Cooling, diluting the mixture with water and ether, washing the ether layer with water, drying it over magnesium sulfate, concentrating and distilling the residue yields diethyl α-methyl-α-(3-thianaphthenylmethyl) - malonate, B.P. 172 to 178° C. at 0.2 mm.

A mixture of 122 g. of the malonate prepared above, 128 g. of potassium hydroxide, 260 ml. of water and 800 ml. of aqueous ethanol is refluxed for 24 hours. The alcohol is removed in vacuo and water is added to the residue. The aqueous solution is washed with ether and made acidic with concentrated hydrochloric acid. The precipitate is isolated by filtration to give α-methyl-α-(3-thianaphthenylmethyl)-malonic acid, M.P. 159–161° C. This malonic acid is heated at 170–200° C. for two hours. Upon cooling, 170 ml. of thionyl chloride is added and the resulting mixture is allowed to stand at room temperature for 36 hours. Evaporation of the excess thionyl chloride and distillation of the residue gives α-methyl-β-(3-thianaphthenyl)-propionyl chloride, B.P. 133 to 138° C. at 0.5 mm.

A solution of 42.0 g. of this propionyl chloride in 200 ml. of dry toluene is added slowly with stirring and warming to 48.0 g. of sodium azide in 200 ml. of dry toluene. Refluxing the mixture for three hours, filtering and evaporating the solvent in vacuo gives crude α-methyl-β-(3-thianaphthenyl)-ethanol isocyanate as the residue.

The isocyanate prepared above is cooled in ice. Concentrated hydrochloric acid (250 ml.) is added and the resulting mixture is heated to frothing with stirring for 15 hours. Cooling the solution in ice gives 3-(2-aminopropyl)-thianaphthene hydrochloride as a precipitate which is filtered off and recrystallized from ethanol-ether.

The hydrochloride is dissolved in water and treated with an excess of sodium hydroxide solution. Extraction with ether and evaporation of the ether in vacuo gives 3-(2'-aminopropyl)-thianaphthene as the residue.

A mixture of 38.2 g. of 3-(2'-aminopropyl)-thianaphthene, 12.2 g. of ethyl chloroacetate and 200 ml. of benzene is refluxed for five hours. The mixture is filtered and the filtrate concentrated. The crude residue is the ethyl ester of N-[1-methyl-2-(3'-thianaphthenyl)-ethyl]-glycine.

The ester prepared above is added portionwise with stirring to a boiling solution of 6.4 g. of sodium hydroxide in 250 ml. of water. The resulting mixture is refluxed for 45 minutes, then extracted with ether. The ether extracts are discarded. The alkaline solution is acidified in an ice bath to pH 2 with concentrated hydrochloric acid. The suspension of N-[1-methyl-2-(3'-thianaphthenyl)-ethyl]-glycine is treated at 0–2° C. with stirring over 30 minutes with 5.5 g. of sodium nitrite in 30 ml. of cold water. The resulting mixture is stirred in an ice bath for two hours. Concentrated hydrochloric acid is added until the mixture has a pH of 2. The mixture is refrigerated for one hour. The precipitate is filtered off and dried over potassium hydroxide to give N-nitroso-N-[1-methyl - 2 - (3'-thianaphthenyl)-ethyl]-glycine.

The nitroso compound is heated on a steam bath with 70 ml. of acetic anhydride for five hours. The solution is filtered and concentrated to give crude N-[1-methyl-2-(3'-thianaphthenyl)-ethyl]-sydnone as the residue.

The sydnone is heated for 4.5 hours on a steam bath with 100 ml. of 1:1 hydrochloric acid. The hot solution is filtered. Concentration of the filtrate, cooling and filtration yields 1-[1'-methyl-2'-(3''-thianaphthenyl)-ethyl]-hydrazine hydrochloride which is purified by recrystallization from ethanol.

The hydrochloride (3.0 g.) is dissolved in water and neutralized with aqueous sodium hydroxide solution. Extraction with ether and concentration of the extracts gives, as the residue, 1 - [1' - methyl - 2' - (3'' - thianaphthenyl)-ethyl]-hydrazine.

One gram of this hydrazine is taken up in 150 ml. of ether-ethyl acetate and treated with an excess of an ethyl acetate solution of maleic acid. Dilution of the mixture with ether and filtration of the precipitate yields crystals of 1-[1'-methyl-2'-(3'' - thianaphthenyl)-ethyl-hydrazine maleate.

*Example 2*

Diethyl α-methylmalonate (87 g.) is added to a solution of 11.5 g. of sodium in one liter of absolute ethanol followed by the addition of 91 g. of 2-chloromethylthianaphthene. The resulting mixture is heated at reflux for 18 hours and worked up as in Example 1 to give diethyl α-methyl-α-(2-thianaphthenylmethyl)-malonate.

Eighty grams of the malonate prepared above, 79 g. of potassium hydroxide, 250 ml. of water and 750 ml. of aqueous ethanol are refluxed for 20 hours. The mixture is concentrated in vacuo; the residue is dissolved in water, washed with ether and made acidic with concentrated hydrochloric acid. The precipitate is filtered off, washed with water and dried to give α-methyl-α-(2-trianaphthenylmethyl)-malonic acid. This malonic acid is decarboxylated by heating at 170–200° C. for three hours, then treated with 150 ml. of thionyl chloride as described in Example 1 to give α-methyl-β-(2-thianaphthenyl)-propionyl chloride.

To 25 g. of sodium azide in 80 ml. of dry xylene is added 23.8 g. of the propionyl chloride, prepared above, in 80 ml. of dry xylene and the resulting mixture is refluxed for three hours, filtered and washed with benzene. Concentration of the filtrate gives, as the residue, α-methyl-β-(2-thianaphthenyl)-ethanol isocyanate, which is cooled in ice and treated with 140 ml. of concentrated hydrochloric acid. The mixture is heated to frothing for 16 hours. Upon cooling, 2-(2'-aminopropyl)-thianaphthene hydrochloride is isolated by filtration.

An aqueous solution of the hydrochloride is treated with an excess of sodium hydroxide solution and extracted with ether. Evaporation of the ether extracts give 2-(2'-aminopropyl)-thianaphthene as the residue.

A mixture of 38.2 g. of 2-(2'-aminopropyl)-thianaphthene, 12.2 g. of ethyl chloroacetate and 250 ml. of benzene is refluxed for six hours, filtered and concentrated in vacuo to give the ethyl ester of N-[1-methyl-2-(2'-thianaphthenyl)-ethyl]-glycine.

This glycine ester is treated with 7.0 g. of sodium hydroxide in aqueous solution and subsequently with concentrated hydrochloric acid as described in Example 1 to obtain a suspension of N-[1-methyl-2-(2'-thianaphthenyl)-ethyl]-glycine which is treated with 6.0 g. of sodium nitrite in 25 ml. of cold water. The resulting mixture is stirred for two hours in an ice bath, then acidified with concentrated hydrochloric acid and chilled. The precipitate is isolated by filtration and dried over potassium hydroxide to give N-nitroso-N-[1-methyl-2-(2'-thianaphthenyl)-ethyl]-glycine.

This nitroso compound is heated with 75 ml. of acetic anhydride for five hours at 90–95° C. The solution is filtered and concentrated to give, as the residue, N-[1-methyl-2-(2'-thianaphthenyl)-ethyl]-sydnone.

The sydnone is heated for five hours on a steam bath with 100 ml. of 1:1 hydrochloric acid. Working up the mixture as in Example 1 gives 1-[1'-methyl-2'-(2''-thianaphthenyl)-ethyl]-hydrazine hydrochloride.

The hydrochloride in aqueous solution is neutralized with sodium hydroxide solution. Extraction with ether and concentration of the extracts gives 1-[1'-methyl-2'-(2''-thianaphthenyl)-ethyl]-hydrazine as the residue.

A sample (1.0 g.) of this residue is dissolved in 75 ml. of ether-ethyl acetate and treated with an excess of citric acid in ether solution. Cooling and filtration yields crystals of 1-[1'-methyl-2'-(2''-thianaphthenyl)-ethyl]-hydrazine citrate.

*Example 3*

Diethyl α-ethylmalonate is condensed with 3-chloromethylthianaphthene in the presence of sodium ethoxide as described in Example 1. The resulting ester is hydrolyzed to the malonic acid which is then decarboxylated to the propionic acid. Treatment with thionyl chloride yields the propionyl chloride which is reacted with sodium azide to give α-ethyl-β-(3-thianaphthenyl)-ethanol isocyanate.

The isocyanate (10.0 g.) is refluxed with 100 ml. of concentrated hydrochloric acid for 16 hours. The mixture is cooled and filtered to give 3-(2'-aminobutyl)-thianaphthene hydrochloride.

A mixture of 41.0 g. of 3-(2'-aminobutyl)-thianaphthene (prepared by treating the hydrochloride with an excess of aqueous sodium hydroxide, extracting with ether and evaporating the ether), 12.2 g. of ethyl chloroacetate and 225 ml. of toluene is refluxed for four hours. Filtration of the reaction mixture and concentration of the filtrate gives, as the residue, the ethyl ester of N-[1-ethyl-2-(3'-thianaphthenyl)-ethyl]-glycine.

The glycine ester is saponified by refluxing in an aqueous solution containing 6.5 g. of sodium hydroxide for one hour. Washing the aqueous solution with ether and acidifying with concentrated hydrochloric acid gives a suspension of N-[1-ethyl-2-(3'-thianaphthenyl)-ethyl]-glycine which is stirred in an ice bath with 6.0 g. of sodium nitrite in 40 ml. of water for two hours. The mixture is acidified with concentrated hydrochloric acid and chilled. The precipitate is filtered off and dried over potassium hydroxide to give N-nitroso-N-[1-ethyl-2-(3'-thianaphthenyl)-ethyl]-glycine.

Heating the nitroso compound with 100 ml. of acetic anhydride on a steam bath for five hours, filtering the solution and concentrating in vacuo gives, as the residue, N-[1-ethyl-2-(3'-thianaphthenyl)-ethyl]-sydnone.

The sydnone is heated for five hours with 100 ml. of 1:1 hydrochloric acid on a steam bath. The hot mixture is filtered. Concentration of the filtrate, cooling and filtration yields 1-[1'-ethyl-2'-(3''-thianaphthenyl)-ethyl]-hydrazine hydrochloride which is recrystallized from ethanol.

An aqueous solution of the hydrochloride is neutralized with sodium hydroxide solution, extracted with ether and the ether extracts evaporated in vacuo to give 1-[1'-ethyl-2'-(3''-thianaphthenyl)-ethyl]-hydrazine as the residue.

*Example 4*

Diethyl α-butylmalonate (216 g.) is condensed with 3-chloromethylthianaphthene (182 g.) in the presence of sodium ethoxide as described in Example 1. The resulting ester is hydrolyzed and decarboxylated to give the propionic acid which is treated with thionyl chloride to obtain the corresponding propionyl chloride. Treatment of the pripionyl chloride with sodium azide gives α-butyl-β-(3-thianaphthenyl)-ethanol isocyanate. Refluxing the isocyanate with concentrated hydrochloric acid, cooling and filtering gives 3-(2'-aminohexyl)-thianaphthene hydrochloride.

A mixture of 93.2 g. of 3-(2'-aminohexyl)-thianaphthene (prepared by neutralizing the hydrochloride in aqueous solution with sodium hydroxide, extracting with ether and evaporating the ether extracts), 24.4 g. of ethyl chloroacetate and 500 ml. of xylene is refluxed for five hours. The reaction mixture is filtered and the filtrate concentrated to give, as the residue, the ethyl ester of N-[1-butyl-2-3'-thianaphthenyl)-ethyl]-glycine.

The glycine ester is saponified by refluxing with 13.0 g. of sodium hydroxide in aqueous solution and acidifying with concentrated hydrochloric acid as in Example 3 to give a suspension of N-[1-butyl-2-(3'-thianaphthenyl)-ethyl]-glycine which is treated with 11.0 g. of sodium nitrite in 30 ml. of cold water. The resulting mixture is stirred at 0–5° C. for three hours, made acid with concentrated hydrochloric acid and chilled. The precipitate is filtered off and dried to give N-nitroso-N-[1-butyl-2-(2'-thianaphthenyl)-ethyl]-glycine.

The nitroso compound is heated on a steam bath with 150 ml. of acetic anhydride for five hours, filtered and concentrated to give, as the residue, N-[1-butyl-2-(3'-thianaphthenyl)-ethyl]-sydnone.

Heating the sydnone on a steam bath for four hours with 200 ml. of 1:1 hydrochloric acid, filtering the hot solution, concentrating the filtrate, cooling and filtering off the precipitate give 1-[1'-butyl-2'-(3''-thianaphthenyl)-ethyl]-hydrazine hydrochloride.

An aqueous solution of the hydrochloride is neutralized with sodium hydroxide solution, extracted with ether and the ether extracts evaporated in vacuo to give 1-[1'-butyl-2'-(3''-thianaphthenyl)-ethyl]-hydrazine as the residue.

*Example 5*

A mixture of 35.4 g. of 3-(2'-aminoethyl)-thianaphthene, 12.2 g. of ethyl chloracetate and 250 ml. of benzene is refluxed for six hours, filtered and concentrated in vacuo to give, as the residue, the ethyl ester of N-[2-(3'-thianaphthenyl)-ethyl]-glycine.

The glycine ester prepared above is added slowly with stirring to a solution of 8.5 g. of potassium hydroxide in 200 ml. of water and the resulting mixture is refluxed for 40 minutes. The mixture is washed with ether and made acid with concentrated hydrochloric acid to obtain a suspension of N-[2-(3'-thianaphthenyl)-ethyl]-glycine which is treated with 6.0 g. of sodium nitrite in 30 ml. of cold water. Working up the mixture as described in Example 1 gives N-nitroso-N-[2-(3'-thianaphthenyl)-ethyl]-glycine.

The nitroso compound is heated at 90–95° C. with 75 ml. of acetic anhydride for six hours. Filtration and concentration of the filtrate gives crude N-[2-(3'-thianaphthenyl)-ethyl]-sydnone as the residue.

Heating this sydnone for five hours at 90–95° C. with 90 ml. of 1:1 hydrochloric acid, filtering the hot solution, concentrating and cooling the filtrate gives 1-[2'-(3''-thianaphthenyl)-ethyl]-hydrazine hydrochloride which is isolated by filtration and purified by recrystallization from ethanol.

The free base is obtained by dissolving the hydrochloride salt in water, neutralizing with aqueous sodium hydroxide solution, extracting with ether and concentrating the ether extracts to give, as the residue, 1-[2'-(3''-thianaphthenyl)-ethyl]-hydrazine.

What is claimed is:

1. A chemical compound having the structural formula:

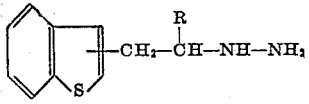

in which R is a member selected from the group consisting of hydrogen and lower alkyl of from 1 to 4 carbon atoms.

2. 1-[1' - methyl - 2' - (3'' - thianaphthenyl)-ethyl]-hydrazine.
3. 1-[2'-(3''-thianaphthenyl)-ethyl]-hydrazine.
4. 1 - [1' - methyl - 2' - (3''-thianaphthenyl)-ethyl]-hydrazine.
5. 1 - [1' - methyl - 2' - (2'' - thianaphthenyl) - ethyl]-hydrazine hydrochloride.
6. 1 - [1' - ethyl - 2' - (3'' - thianaphthenyl) - ethyl]-hydrazine.
7. A chemical compound having the structural formula:

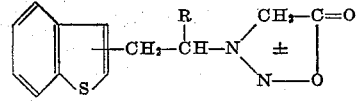

in which R is a member selected from the group consisting of hydrogen and lower alkyl of from 1 to 4 carbon atoms.

8. A chemical compound having the structural formula:

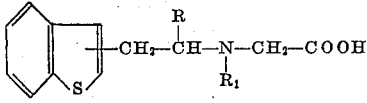

in which R is a member selected from the group consisting of hydrogen and lower alkyl of from 1 to 4 carbon atoms and $R_1$ is a member selected from the group consisting of hydrogen and nitroso.

No references cited.